US012485418B2

(12) United States Patent
Zhang et al.

(10) Patent No.: US 12,485,418 B2
(45) Date of Patent: Dec. 2, 2025

(54) MICROFLUIDIC CHIP FOR ANALYTE DETECTION

(71) Applicant: LEADWAY (HK) LIMITED, Hong Kong (CN)

(72) Inventors: Xin Zhang, Zhejiang (CN); Yi Wang, Zhejiang (CN); Li Zhang, Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 789 days.

(21) Appl. No.: 17/769,484

(22) PCT Filed: Oct. 16, 2020

(86) PCT No.: PCT/CN2020/121336
§ 371 (c)(1),
(2) Date: Apr. 15, 2022

(87) PCT Pub. No.: WO2021/073582
PCT Pub. Date: Apr. 22, 2021

(65) Prior Publication Data

US 2024/0131514 A1 Apr. 25, 2024
US 2024/0226891 A9 Jul. 11, 2024

(30) Foreign Application Priority Data

Oct. 18, 2019 (CN) ......................... 201910991112.0

(51) Int. Cl.
*B01L 3/00* (2006.01)

(52) U.S. Cl.
CPC . *B01L 3/502753* (2013.01); *B01L 2200/0689* (2013.01); *B01L 2300/048* (2013.01)

(58) Field of Classification Search
CPC ....... B01L 3/502753; B01L 2200/0689; B01L 2300/048; B01L 2300/044;
(Continued)

(56) References Cited

U.S. PATENT DOCUMENTS 5,096,669 A * 3/1992 Lauks ............... B01L 3/502715 324/438
2006/0183216 A1 * 8/2006 Handique ......... B01L 3/502738 222/14
2018/0290139 A1 10/2018 Kurkowski et al.

FOREIGN PATENT DOCUMENTS

CN 105203746 A 12/2015
CN 108686721 A 10/2018
(Continued)

OTHER PUBLICATIONS

Extended European Search Report issued in EP 20877672 dated Oct. 23, 2023 (9 pages).
(Continued)

*Primary Examiner* — Maris R Kessel
*Assistant Examiner* — May Leung Chiu
(74) *Attorney, Agent, or Firm* — Michael A. Whittaker

(57) ABSTRACT

A microfluidic chip for analyte detection, which is provided with a liquid storage tank (121), the liquid storage tank (121) is internally provided with a through hole I (141), one opening of the through hole I is located in the liquid storage tank, and the liquid in the liquid storage tank passes through the through hole I to bypass the outer boundary (12511) of the portion where the inner surface of the liquid storage tank contacts the sealing member, thereby avoiding leakage due to a possible gap in a sealed position when the liquid flows through the sealed position. At the same time, the design can reduce the processing precision requirement, save cost, etc.

7 Claims, 8 Drawing Sheets

(58) Field of Classification Search
CPC ..... B01L 2300/0672; B01L 2300/0867; B01L 2300/0887; B01L 2300/123; B01L 2400/0481; B01L 3/502715; B01L 3/50273; B01L 3/502707; B01L 2400/0478
See application file for complete search history.

(56) References Cited

FOREIGN PATENT DOCUMENTS

| | | | |
|---|---|---|---|
| CN | 211274689 | U | 8/2020 |
| CN | 211412058 | U | 9/2020 |
| DE | 102012222719 | | 6/2014 |
| EP | 3406340 | A1 | 11/2018 |
| WO | 2009152952 | A1 | 12/2009 |
| WO | 2018153953 | A1 | 8/2018 |
| WO | WO-2018153950 | A1 * | 8/2018 |
| WO | 2021073582 | A1 | 4/2021 |

OTHER PUBLICATIONS

First Office Action issued by SIPO in CN 201910991112.0 dated May 18, 2022—incl Engl lang transl (12 pages total).
International Search Report and Written Opinion issued in PCT/CN2020/121336 dated Jan. 15, 2021—incl Engl lang transl (17 pages total).

* cited by examiner

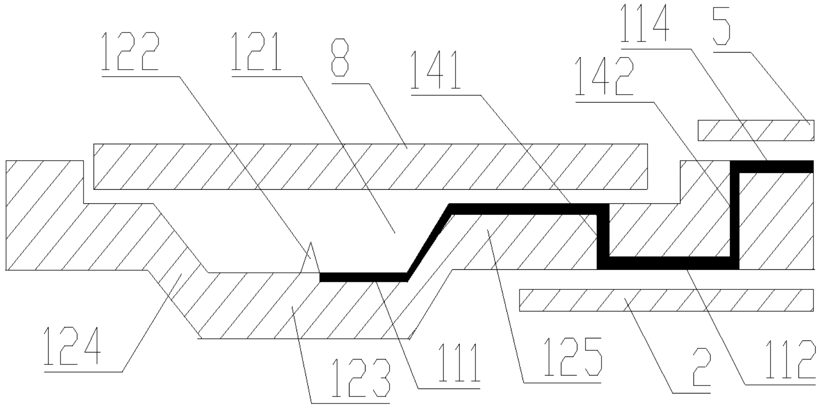
Fig. 5-a
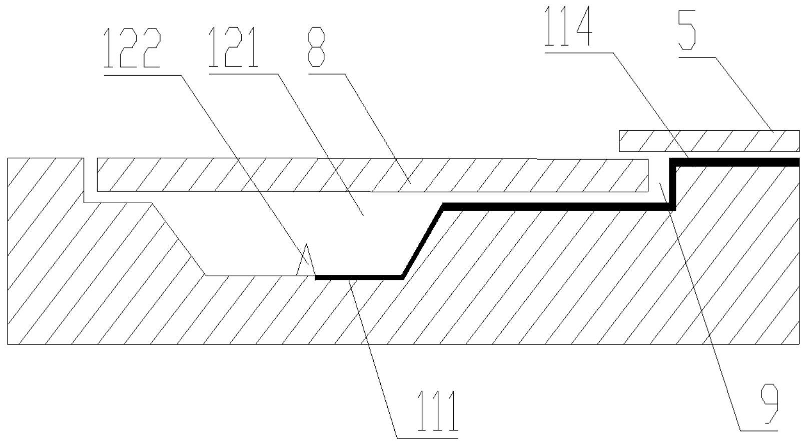
Fig. 5-b
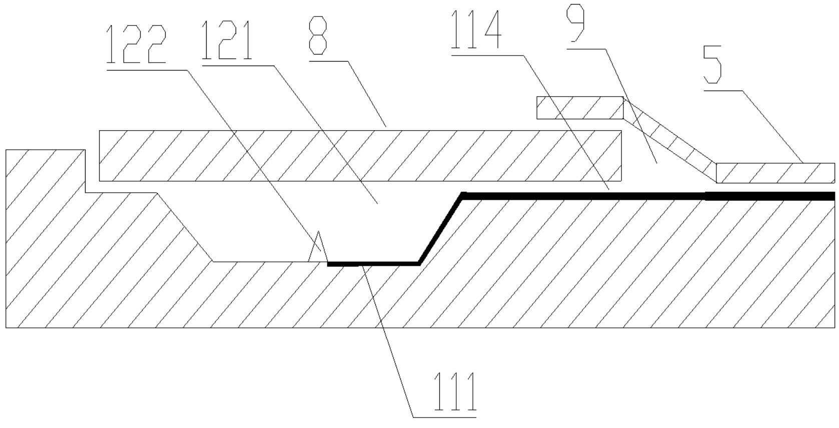
Fig. 5-c

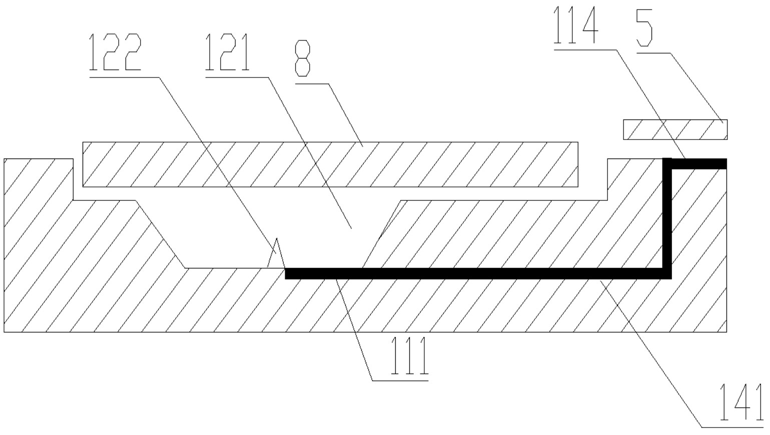
Fig. 5-d
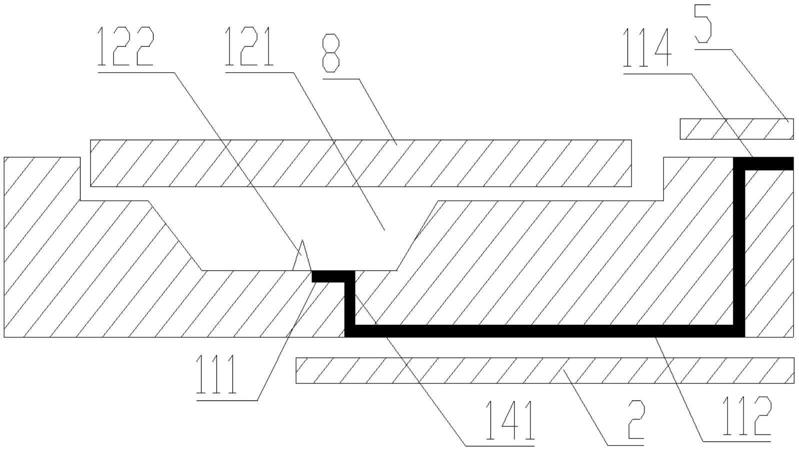
Fig. 5-e

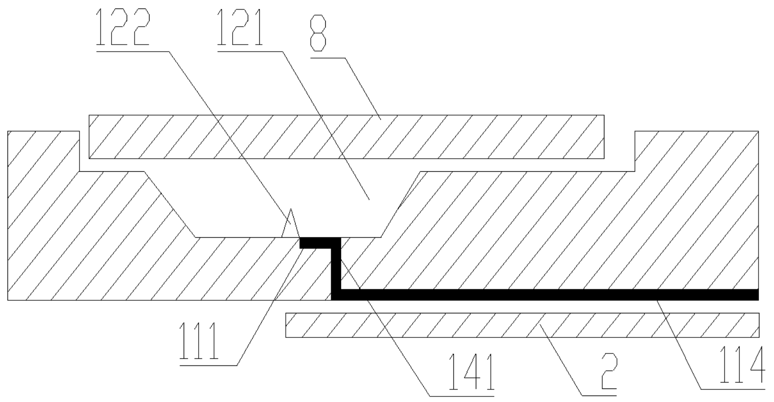
Fig. 5-f
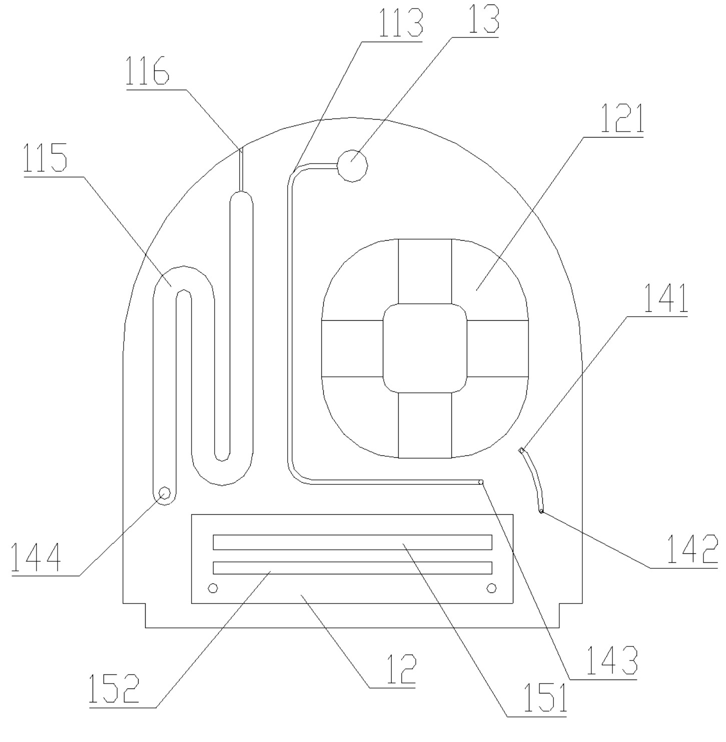
Fig. 6

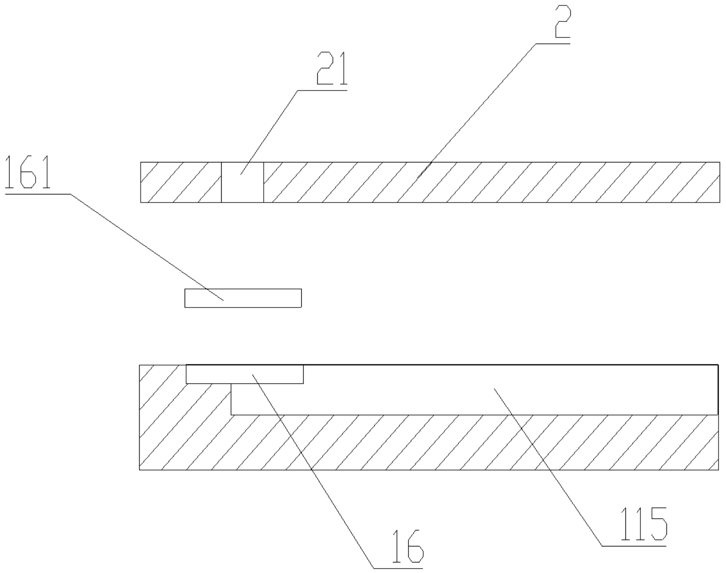
Fig. 9
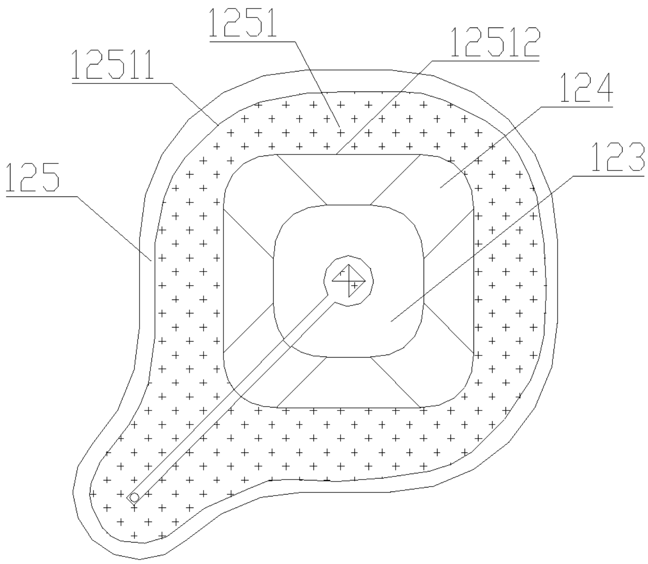
Fig. 10-a

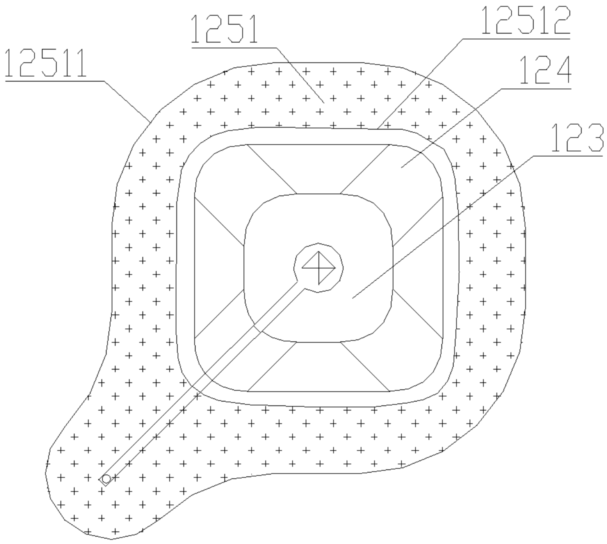
Fig.10-b

MICROFLUIDIC CHIP FOR ANALYTE DETECTION

CROSS-REFERENCE TO RELATED MATTERS

The present invention is filed under 35 U.S.C. § 371 as the U.S. national phase of International Patent Application No. PCT/CN2020/121336, filed Oct. 16, 2020, which designated the United States and claims priority to Chinese Patent Application No. 201910991112.0, filed Oct. 18, 2019, each of which is hereby incorporated in its entirety including all tables, figures and claims.

TECHNICAL FIELD

The present invention belongs to the technical field of medical diagnostic articles, and relates to a microfluidic chip for detection of an analyte and manufacturing and use methods thereof.

BACKGROUND OF THE INVENTION

In the field of biomedical analysis and disease diagnosis, emergence of the microfluidic technology has promoted development of the point-of-care testing (POCT) industry. For previous POCT equipment, solutions such as calibration solution and detection reagent are all disposed outside the equipment, resulting in problems such as large volume of the detection equipment, complicated pipelines, difficult maintenance, liable contamination, and the like. In addition, due to the characteristics of the detection principle, it is difficult for the previous POCT products to detect a plurality of indicators simultaneously while performing rapid and precise quantitative analysis, which in turn increases the consumption of a sample to be detected and personal errors. In contrast, the greatest advantage of the microfluidic detection technology is that it can perform fully automated rapid detection on multiple indicators simultaneously and obtain accurate results under the consumption of a blood sample in a microliter level. Moreover, a microfluidic chip in the size of square centimetre can include all functional units in a conventional laboratory such as quantitative injection, mixing, reaction, calibration, reagent storage, detection and waste liquid collection units.

Fluid control is the core of design of a microfluidic chip, and all functions of the microfluidic chip rely on unique designs of a microstructure and a microchannel network. It is always difficult in product development to dispose a micro liquid storage device containing reagents in a chip through ingenious designs and release medicinal solutions on time in the chip operating process through simple, convenient and safe operations without undesirable phenomena, such as liquid leakage and bubbles. In U.S. Pat. No. 5,096,669A, the chip is formed by assembly of an upper layer plate member, a lower layer plate member and an intermediate layer of double sided adhesive, wherein the upper layer plate member and the lower layer plate member are provided with liquid storage pouch grooves and microchannels; and the double sided adhesive layer is provided with microchannel and aperture structures. After a liquid storage pouch is pierced through squeezing, the reagent enters the channel in the liquid storage pouch groove of the lower layer plate member, then reaches the channel between the double sided adhesive and the upper layer plate member after passing through the aperture on the double sided adhesive, and flows into the electrode detection area in the squeezing process. Such design requires mated design of the microchannels of the upper and lower layer plate members, which requires high machining precision, and two models are required to manufacture the upper and lower plate members respectively. Therefore, the structure of the chip is complicated, the structure of the two layers of plate members and the double sided adhesive require precise cutting, so that the cost is increased. In addition, the aligning assembly of the three-layer structure has high precision requirements, which is adverse to efficient production and increases the probability of defective goods. In U.S. Pat. No. 7,842,234B, the built-in liquid storage pouch has a micro valve, and before release of a reagent, the area in the valve needs to be squeezed first to open the valve, and then the body of the liquid storage pouch is squeezed to release the reagent. This micro valve design increases the machining difficulty and the cost, and meanwhile, complicated operations also increase the risk of failed detection.

SUMMARY OF THE INVENTION

On the premise of ensuring the detection effect, in order to reduce the difficulty of chip preparation and simplify the production process, the present invention provides a microfluidic chip for detection of an analyte, specifically as follows:

A microfluidic chip for detection of an analyte includes a chip body, a sealing plate and a sensor for detecting the analyte, wherein the chip body includes a front side and a back side, and an injection port, a liquid storage tank, and a micro flow channel groove located on the surface of the chip body are distributed on the chip body; the opening of the micro flow channel groove is water-tightly sealed by the sealing plate to form a micro flow channel including a main micro flow channel, the chip body is provided with a detection area in which the sensor is located, and the main micro flow channel passes through the detection area and comes into contact with a detection part for detecting the analyte on the sensor; the liquid storage tank is provided therein with a through hole I, with one opening of the through hole I being located on the inner surface of the liquid storage tank, and the other opening of the through hole I communicating with the micro flow channel, thereby allowing the liquid in the liquid storage tank to flow into the main micro flow channel; the injection port communicates with the main micro flow channel, thereby allowing the liquid injected into the injection port to flow into the main micro flow channel; the liquid storage tank is provided with an opening, which is water-tightly sealed by a sealing member, the part, in contact with the sealing member, on the inner surface of the liquid storage tank has an outer boundary, and the liquid in the liquid storage tank bypasses the outer boundary through the through hole I.

Preferably, the sealing member includes a gland and/or liquid storage bag.

Preferably, the sealing member includes the gland and the liquid storage bag fixed in the liquid storage tank by the gland.

Preferably, the inner surface of the liquid storage tank is provided with a puncture needle for puncturing the liquid storage bag.

Preferably, the liquid storage tank includes a bottom platform, a liquid storage tank side wall, and an edge platform located above the bottom platform, and the outer edge of the bottom platform is connected with the inner edge of the edge platform through the liquid storage tank side wall, the wall surface of which inclines upwards.

Preferably, the gland covers and seals the edge platform of the liquid storage tank.

Preferably, one opening of the through hole I is located on the edge platform, but not on the outer boundary of part where the gland seals the edge platform of the liquid storage tank. That is, the liquid flows to an opening of the through hole I to enter this through hole, thus avoiding the fact that liquid flows to the outer boundary of the part where the gland seals the edge platform of the liquid storage tank, which effectively prevents leakage.

Preferably, one opening of the through hole I is located on the liquid storage tank side wall or the bottom platform.

Preferably, the other opening is connected with the micro flow channel located on the front side/back side of the chip body.

Preferably, that is, one opening of the through hole I is located on the edge platform, and the other opening is connected with the micro flow channel located on the front side/back side of the chip body; or one opening of the through hole I is located on the liquid storage tank side wall, and the other opening is connected with the micro flow channel located on the front side/back side of the chip body; or one opening of the through hole I is located on the bottom platform, and the other opening is connected with the micro flow channel located on the front side/back side of the chip body.

Preferably, the micro flow channel includes the main micro flow channel and a branch micro flow channel.

Preferably, the other opening of the through hole I communicates with the main micro flow channel through the branch micro flow channel.

Preferably, the chip body is also provided with a through hole II not located in the liquid storage tank; the branch micro flow channel is located on the back side of the chip body, the main micro flow channel is located on the front side of the chip body, and the branch micro flow channel communicates with the main micro flow channel through the through hole II.

Preferably, the inner surface of the liquid storage tank is provided with a diversion groove for diversion of liquid, and the diversion groove is connected with the through hole I.

Preferably, the inner surface of the liquid storage tank is provided with a diversion groove for diversion of liquid, and one end of the diversion groove is connected with the through hole I.

Preferably, the inner surface of the liquid storage tank is provided with a diversion groove for diversion of liquid, one end of the diversion groove is connected with the through hole I, and the other end of the diversion groove is connected with the puncture needle.

Preferably, the gland includes a pressing plate with an opening in the middle and a side plate; the bottom of the side plate is disposed around the inner edge of the opening of the pressing plate, and the side plate inclines inwards, but does not seal the opening of the pressing plate.

Preferably, the chip body is provided with a hydrophobic waste liquid tank communicating with the main micro flow channel, and the tail end of the waste liquid tank is provided with an air permeable channel which is air permeable but water impermeable.

Preferably, the micro flow channel also includes a branch micro flow channel; the branch micro flow channel is located on the back side of the chip body, while the main micro flow channel is located on the front side of the chip body; the diversion groove communicates with the branch micro flow channel through the through hole I, and the branch micro flow channel communicates with the main micro flow channel through the through hole II not close to the edge of the gland.

Preferably, one end of the diversion groove is disposed on the bottom platform, the other end of the diversion groove is disposed on the edge platform, and the opening at one end of the through hole is located on the edge platform, and is covered by the gland.

Preferably, the air permeable channel is a hydrophobic air permeable flow channel, the tail end of the waste liquid tank is connected with one end of the air permeable flow channel, the other end of the air flow channel communicates with outside atmosphere, and the sectional area of the air permeable channel is not more than 1 $mm^2$.

Preferably, the air permeable channel includes an air permeable groove and an air permeable film which is air permeable but water impermeable; the tail end of the waste liquid tank communicates with the air permeable groove, the edge of the tail end of the waste liquid tank is located in the air permeable groove, and has a depth larger than that of the air permeable groove; the bottom of the air permeable groove is covered with the air permeable film, which completely covers the tail end of the waste liquid tank and is covered with the sealing plate, the sealing plate is provided with an air permeable hole corresponding to the air permeable groove in position, so that the air in the waste liquid tank can enter outside atmosphere through the air permeable film.

Another microfluidic chip for detection of an analyte includes a chip body, a sealing plate, a gland and a sensor for detecting the analyte, wherein an injection port, a liquid storage tank, a waste liquid tank and a micro flow channel groove located on the surface of the chip body are distributed on the chip body; the micro flow channel groove is distributed on both the front and back sides of the chip body, the opening of the micro flow channel groove is watertightly sealed by the sealing plate to form a micro flow channel, and the micro flow channel distributed on the front side of the chip body communicates with the micro flow channel distributed on the back side of the chip body through the through pore; the micro flow channel includes a branch micro flow channel and a main micro flow channel; the injection port and the liquid storage tank respectively communicate with one end of the main micro flow channel through the branch micro flow channel, and the other end of the main micro flow channel communicates with one end of the waste liquid tank; the detection area of the sensor for detecting the analyte is exposed in the main micro flow channel; a diversion groove for diversion of liquid is disposed on the inner surface of the liquid storage tank, one end of the diversion groove is near the edge of the liquid storage tank and communicates with the branch micro flow channel located on the other side of the chip body through the through hole, and the gland covers the through hole located in the liquid storage tank.

Preferably, a liquid storage bag which can be ruptured is included; and the liquid storage bag is covered in the liquid storage tank by the gland.

Preferably, the puncture needle is disposed in the liquid storage tank, is located below the liquid storage bag, and communicates with the diversion groove.

Preferably, the gland includes a pressing plate with an opening in the middle and a side plate; the bottom of the side plate is disposed around the inner edge of the opening of the pressing plate, and the side plate inclines inwards, but does not seal the opening of the pressing plate.

Preferably, a detection slot is disposed in the main micro flow channel, and runs through the chip body, and the sensor is installed on the side opposite to the side on which the micro flow channel is disposed, and water-tightly covers the detection slot where the electrode area is located.

Preferably, the chip body is provided with a contact slot running through the chip body, one side of the contact slot is water-tightly covered by the sensor, the other side of the contact slot is uncovered, the contacts of the sensor are located in the contact slot, and the contact slot does not communicate with any groove and micro flow channel on the chip body.

Preferably, the other end of the main micro flow channel communicates with one end of the waste liquid tank, and the waste liquid tank communicates with an air permeable channel which is air permeable but water impermeable.

Preferably, the air permeable channel is a hydrophobic air permeable flow channel, the tail end of the waste liquid tank is connected with one end of the air permeable flow channel, the other end of the air permeable flow channel communicates with outside atmosphere, and the sectional area of the air permeable flow channel is not more than 1 $mm^2$.

Preferably, the air permeable channel includes an air permeable groove and an air permeable film which is air permeable but water impermeable; the tail end of the waste liquid tank communicates with the air permeable groove, the edge of the tail end of the waste liquid tank is located in the air permeable groove, and has a depth larger than that of the air permeable groove; the bottom of the air permeable groove is covered with the air permeable film, which completely covers the tail end of the waste liquid tank and is covered with the sealing plate, the sealing plate is provided with an air permeable hole corresponding to the air permeable groove in position, so that the air in the waste liquid tank can enter outside atmosphere through the air permeable film.

A preparation method of a microfluidic chip includes:

step 1, a hydrophobic material is selected as a substrate, and a micro flow channel groove, a liquid storage tank, through holes, an injection port and other structures are formed on the chip body by etching, engraving, hot pressing or injection molding; specifically, the micro flow channel groove includes a main micro flow channel groove, the through holes include a through hole I disposed in the liquid storage tank, with one opening of the through hole I being located on the inner surface of the liquid storage tank, and the other opening of the through hole I communicating with the micro flow channel groove, thereby allowing the liquid in the liquid storage tank to flow into the main micro flow channel groove; the injection port communicates with the micro flow channel groove, thereby allowing the liquid injected into the injection port to flow into the main micro flow channel groove;

step 2, a sensor is obtained and bonded to the surface of the chip body, so that the detection area of the sensor is located in the main micro flow channel groove;

step 3, a sealing plate is obtained and water-tightly covers the micro flow channel groove located on the surface of the chip body, and the opening of the micro flow channel groove is closed to form a micro flow channel; and step 4, a gland is obtained and water-tightly covers the opening of the liquid storage tank.

A microfluidic detection chip that can be used for detection is finally obtained through the method including steps 1-4. The sequences of steps 2-4 can be adjusted without conflicts.

Preferably, in step 1, the inner surface of the liquid storage tank is provided with a diversion groove for diversion of liquid, and one end of the diversion groove is connected with the through hole I.

Preferably, in step 4, the liquid storage bag and the gland are obtained, the liquid storage bag is fixed in the liquid storage tank, and then the gland water-tightly covers the opening of the liquid storage tank.

Preferably, in step 1, the puncture needle is prepared on the inner surface of the liquid storage tank, and is located below the liquid storage bag.

Preferably, in step 1, the puncture needle communicates with the through hole I through the diversion groove.

Preferably, in step 1, the chip body includes a front side and a back side, and the micro flow channel groove also includes a branch micro flow channel groove; the branch micro flow channel groove is located on the back side of the chip body, and the main micro flow channel groove is located on the front side of the chip body; the diversion groove communicates with the branch micro flow channel groove through the through hole I, and the branch micro flow channel groove communicates with the main micro flow channel groove through the through hole II located outside the liquid storage tank.

Preferably, in step 1, the liquid storage tank includes a bottom platform, a liquid storage tank side wall, and an edge platform located above the bottom platform, and the outer edge of the bottom platform is connected with the inner edge of the edge platform through the liquid storage tank side wall which inclines upwards.

Preferably, in step 1, one end of the diversion groove is disposed on the bottom platform, the other end of the diversion groove is disposed on the edge platform, the opening at one end of the through hole is located on the edge platform, and in step 4, the through hole is covered by the gland.

Preferably, in step 4, the gland includes a pressing plate with an opening in the middle and a side plate; the bottom of the side plate is disposed around the inner edge of the opening of the pressing plate, and the side plate inclines inwards, but does not seal the opening of the pressing plate.

Preferably, in step 1, the bottom platform protrudes from the back side of the chip body.

Preferably, in step 1, the chip body is provided with a hydrophobic waste liquid tank communicating with the main micro flow channel groove, and the tail end of the waste liquid tank is provided with an air permeable channel which is air permeable but water impermeable.

Preferably, in step 1, the chip body is made of a hydrophobic material; in step 3, the covering surface of the sealing plate covering the back side of the chip body is hydrophobic, and the covering surface of the sealing plate covering the front side of the chip body is hydrophilic.

Compared with the prior art, the present invention has the following beneficial effects:

1. the micro flow channel is distributed on the front and back sides of the same substrate, which is favorable for reducing the size of the chip and the assembly steps;
2. one opening of the through hole is disposed in the liquid storage tank, and liquid directly flows out through the through hole, thereby avoiding leakage of the liquid from the sealed part of the liquid storage tank;

3. the liquid in the liquid storage tank flows into the micro flow channel on the other side through the through hole when flowing towards the edge of the liquid storage tank, thereby avoiding leakage after it flows through gaps; and
4. due to the design of the air permeable film at the tail end of the waste liquid tank, waste liquid is prevented from flowing out, thereby avoiding the problem of waste liquid contamination.

BRIEF DESCRIPTION OF THE DRAWINGS

FIG. 5-*a* is a partially sectional schematic diagram of the back side along A-A in FIG. 4, FIGS. 5-*b* and 5-*c* are schematic diagrams showing the edge of the gland is in contact with the micro flow channel groove, and FIGS. 5-*d*, 5-*e* and 5-*f* are schematic diagrams of the liquid storage tank part respectively in an embodiment;

FIG. 6 is a structural schematic diagram of the back side of the chip body in FIG. 3;

FIG. 9 is a sectional schematic diagram of the air permeable channel part in FIG. 8; and FIGS. 10-*a* and 10-*b* are schematic diagrams of a sealing area formed between a sealing member and a liquid storage tank.

DETAILED DESCRIPTION OF THE EMBODIMENTS

The technical solutions in embodiments of the present invention will be clearly and completely described below in conjunction with the specific embodiments and the accompanying drawings. However, the embodiments described below are merely part of the embodiments of the present invention. According to the technical idea of the present invention, the embodiments extended from any or a combination of the following technical solutions all fall within the protection scope of the present invention.

In addition, unless otherwise specifically indicated, the directional words such as "upper", "lower", "left" and "right" that may be involved hereafter are relative positions of various components, rather than absolute spatial positions.

Figure 4:
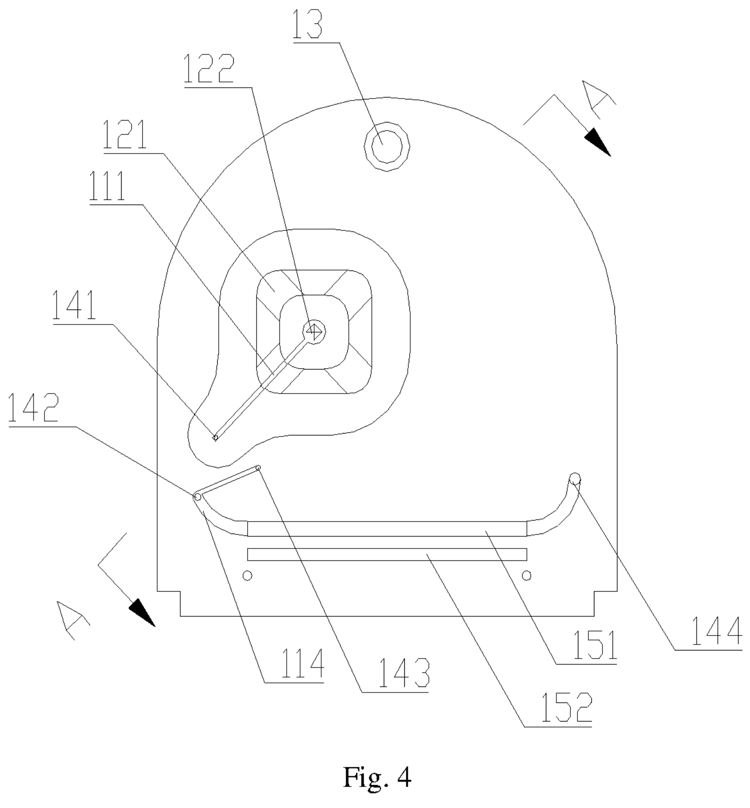
FIG. 4 is a structural schematic diagram of the front side of the chip body in FIG. 3.

Some phrases in the present invention are explained below:

the micro flow channel refers to that when the width or depth of the flow channel is in the level of millimeter or micron order, the flow of the fluid in the flow channel is affected primarily by interfacial tension;

the hydrophilic micro flow channel refers to a micro flow channel with hydrophilcity, where in the micro flow channel, the hydrophilic liquid flows forwards or has the trend of flowing forwards under the pulling of the interfacial tension;

the hydrophobic micro flow channel refers to a micro flow channel with hydrophobicity, where in the micro flow channel, the flow of the hydrophobic liquid is hindered under the pulling of the interfacial tension;

unless otherwise specifically stated, the through hole in the present invention is a pore passage running through the front and back sides of the chip body, however, for the through hole in the liquid storage tank, one of its openings is located on the inner surface of the liquid storage tank, and the other opening is located on the front side (such as FIG. 5-*d*) or back side (such as FIGS. 5-*a*, 5-*e* and 5-*f*) of the chip body excluding the liquid storage tank;

the surface of the chip body refers to the outer layer with concave and convex configuration of the chip body, including the inner surface and the outer surface of the liquid storage tank;

the surface of the chip body includes a front side, a back side and a lateral side surrounding the chip body, and the front side of the chip body is the side shown in FIG. 4;

the inner surface of the liquid storage tank is the side of the liquid storage tank shown in FIG. 4, and the outer surface of the liquid storage tank is the side of the liquid storage tank shown in FIG. 6; and as shown in FIGS. 10-*a* and 10-*b*, the inner surface of the liquid storage tank is in contact with the lower surface of the sealing member and is sealed to form a sealing area 1251, an outer boundary line surrounding this sealing area 1251 is the outer boundary 12511, which corresponds to the outer boundary line surrounding the lower surface of the sealing member, and the inner boundary line surrounding the sealing area 1251 is the inner boundary 12512.

The present invention provides a microfluidic chip for detection of an analyte, including a chip body 1, a sealing plate and a sensor 4 for detecting the analyte. The chip body 1 includes a front side and a back side, and an injection port 13, a liquid storage tank 121 and a micro flow channel groove located on the surface of the chip body 1 are distributed on the chip body 1. The opening of the micro flow channel groove is water-tightly sealed by the sealing plate to form a micro flow channel.

The micro flow channel includes a main micro flow channel; the chip body 1 has a detection area in which the sensor 4 is located; and the main micro flow channel passes through the detection area and comes into contact with a detection part for detecting the analyte on the sensor 4.

The liquid storage tank 121 is provided therein with a through hole I 141, with one opening of the through hole I 141 being located on the inner surface of the liquid storage tank 121, and the other opening of the through hole I 141 communicating with the micro flow channel, thereby allowing the liquid in the liquid storage tank 121 to flow into the main micro flow channel. The injection port 13 communicates with the micro flow channel, thereby allowing the liquid injected into the injection port 13 to flow into the main micro flow channel.

The liquid storage tank 121 has an opening which is water-tightly sealed by a sealing member, the part, in contact with the sealing member, on the inner surface of the liquid storage tank 121 has an outer boundary 12511, and the micro flow channel groove does not contact the outer boundary 12511.

In a preferred embodiment, as in FIG. 10-*a*, the inner boundary 12512 of the part, in contact with the surface of the liquid storage tank 121, of the sealing member overlaps with the inner edge of edge platform 125. In another embodiment, as in FIG. 10-*b*, the inner boundary 12512 does not overlap with the inner edge of the edge platform 125. When the through hole I 141 is hydrophobic, its interfacial tension has a hindering effect on the entry of the liquid in the liquid storage tank 121, so that the liquid can be directly encapsulated in the liquid storage tank 121 without use of the liquid storage bag 7. In addition to this, it is necessary to design part or all of the bottom of the liquid storage tank 121 or/and the gland 8 to be deformable for squeezing the liquid in the liquid storage tank 121 to force the liquid to flow into the through hole I 141. The deformable parts include, but are not limited to, being prepared from soft plastic or rubber. Moreover, it is also possible to provide, on the liquid storage tank 121 or the gland 8, an interface for connecting a booster pump, so that the liquid in the liquid storage tank 121 is pushed into the through hole I 141 by the booster pump.

In a preferred embodiment, the liquid storage tank 121 is provided with a liquid storage bag 7 which is fixed in the liquid storage tank 121 by the gland 8, a puncture needle 122 is provided under the liquid storage bag 7, and the liquid in the liquid storage bag 7 flows into the liquid storage tank 121 after the liquid storage bag is squeezed to be punctured by the puncture needle 122.

When the liquid storage bag 7 is made of a material with poor ductility or the width of the sealed edge is small, the liquid storage bag 7 is easy to rupture under the squeezing of proper force, and at this time, the puncture needle 122 can be optionally not disposed in the liquid storage tank 121.

The sealing member is one or more components used to seal the opening of the liquid storage tank 121. When the liquid storage bag 7 is not used, the opening of the liquid storage tank 121 is water-tightly sealed by the gland 8, the liquid in the liquid storage tank 121 is stored in the liquid storage tank 121 without external forces, and in this case, the sealing member is the gland 8. When the gland 8 is fixed by an adhesive or a bonding layer 6, the sealing member includes the gland 8 and the bonding layer 6. When the gland 8 is welded by ultrasound, the sealing member is the gland 8. In addition, when one or more spacer layers are disposed between the contact parts of the gland 8 and the liquid storage tank 121, the sealing member also includes these spacer layers. When the liquid storage bag 7 is used for storing liquid, the liquid storage bag 7 is sealed in the liquid storage tank 121 by the sealing member.

When the liquid storage bag 7 is fixed to the inner surface of the liquid storage tank 121, the liquid storage bag 7 can alone have the effect of closing the opening of the liquid storage tank 121, and in this case, the liquid storage bag 7 can be separately regarded as the sealing member. The liquid storage bag 7 is fixed by the adhesive or bonding layer 6 and water-tightly covers the opening of the liquid storage tank 121, and in this case, the sealing member is the liquid storage bag 7 and the bonding layer 6. The liquid storage bag 7 and the gland 8 may be combined as the sealing member for closing the liquid storage bag 121. On the basis that the sealing member includes the liquid storage bag 7 and the gland 8, the sealing member may include a bonding layer 6 for bonding between the liquid storage bag 7 and the liquid storage tank 121, or include a bonding layer 6 between the liquid storage bag 7 and the gland 8, or include a spacer layer for spacing between the liquid storage bag 7 and the liquid storage tank 121, or include a spacer layer for spacing between the liquid storage bag 7 and the gland 8, or include the bonding layer 6 and the spacer layer described earlier.

The chip body 1 can be optionally provided with a waste liquid tank, and when no waste liquid tank is provided, an interface for liquid outflow can be disposed to collect the liquid after detection into a standalone module for storing the liquid, or the liquid can be pumped out by a pump.

By distributing the micro flow channel on two sides of one substrate, the present invention not only reduces the area of the chip, but also reduces the difficulty of the fabrication process. For the preparation of the chip body 1, it can be realized by one or more machining methods such as injection molding and etching.

Embodiment 1 of Chip Body

Taking FIGS. 1, 3, 4, 6 and 7 as examples, the micro flow channel includes a second micro flow channel 112, a third micro flow channel 113, and a fourth micro flow channel 114, where the second micro flow channel 112 and the third micro flow channel 113 act as branch micro flow channels to sequentially lead the liquid in the liquid storage tank 121 and the liquid injected into the injection port 13 to the fourth micro flow channel 114 (the main micro flow channel). The micro flow channel groove located on the inner surface of the liquid storage tank 121 is a diversion groove for diverting the liquid in the liquid storage tank 121 to flow towards the through hole I 141.

Specifically, the liquid storage tank 121 and the fourth micro flow channel 114 are distributed on the front side (taking the side shown in FIG. 4 as the front side) of the chip body 1, the fourth micro flow channel 114 is a hydrophilic micro flow channel, and the liquid storage tank 121 is also provided with the diversion groove 111 which is hydrophobic, and a puncture needle 122. The second micro flow channel 112, the third micro flow channel 113, a waste liquid tank 115 and an air permeable channel are distributed on the back side of the chip body 1, and the second micro flow channel 112 and the third micro flow channel 113 are hydrophobic micro flow channels. The injection port 13, a detection slot 151 and through holes (including a through hole I 141, a through hole II 142, a through hole III 143 and a through hole IV 144) penetrating through the chip body 1. Their connection relation is as follows: the surface or interior of the puncture needle 122 in the liquid storage tank 121 is provided with a channel for diversion, which communicates with the front end of the diversion groove 111 located on the surface of the liquid storage tank 121, thereby allowing the liquid to flow into the diversion groove 111 through the channel on the puncture needle 122; the tail end of the diversion groove 111 communicates with the front end of the second micro flow channel 112 located on the back side of the chip body 1 through the through hole I 141, and the tail end of the diversion groove 111 remains within the liquid storage tank 121, but does not contact the edge of the liquid storage tank 121; the tail end of the second micro flow channel 112 communicates with the fourth micro flow channel 114 located on the front side of the chip body 1 through the through hole II 142 which is not disposed at the front end of the fourth micro flow channel 114; the front end of the third micro flow channel 113 located on the back side of the chip body 1 passes into the injection port 13, the tail end of the third micro flow channel 113 communicates with the front end of the fourth micro flow channel 114 through the through hole III 143, and the distance between the through hole II 142 and the through hole III 143 along the fourth micro flow channel 114 is more than 1 mm, not less than 2 mm in some embodiments, and not less than 3 mm in some embodiments; the middle part of the fourth micro flow channel 114 (completely or partially) overlaps with the elongated detection slot 151, the elongated shape of the detection slot 151 is straight or curved, and the middle part of the fourth micro flow channel 114 here is not the middle spatially geometrically strictly defined, but refers to a part between the through hole II 142 and the through hole IV 144; the tail end of the fourth micro flow channel 114 is connected with the front end of the waste liquid tank 115 through the through hole IV 144; and the tail end of the fourth micro flow channel 114 is connected with the air permeable channel.

The overlap of the through hole II 142 and the through hole III 143 results in that the liquid in the second micro flow channel 112 will partially enter the third micro flow channel 113, or the liquid in the third micro flow channel 113 will partially enter the second micro flow channel 112. The non-overlap of the through hole II 142 and the through hole III 143 can ensure that the liquid from both the second micro flow channel 112 and the third micro flow channel 113 can enter the fourth micro flow channel 114. This is because the second micro flow channel 112 and the third micro flow channel 113 connected to the hydrophilic fourth micro flow channel 114 are hydrophobic and the through holes are also hydrophobic, the liquid entering the fourth micro flow channel 114 is more likely to flow in the fourth micro flow channel 114, instead of entering the hydrophobic second micro flow channel 112 or third micro flow channel 113.

For those existing implementations that the micro flow channel groove is distributed on the same side of the chip body 1, as shown in FIGS. 5-*b* and 5-*c*, the gland 8 covers the part of the micro flow channel groove located in the liquid storage tank 121, and the remaining micro flow channel groove is covered by the upper sealing plate 5 or other material. If the gland 8 as shown in FIG. 5-*b*, is higher than the surface of the chip body 1, in order to completely cover the micro flow channel groove, one way is that the edge of the upper sealing plate 5 needs to cover the gland 8, thus forming a gap 9 at the edge of the gland 8. In order to remove this gap 9, the configuration of this part of the upper sealing plate 5 needs to fit such undulation, which undoubtedly requires high machining and assembly precision to fit this undulation and also increases the machining steps at the same time. Another way is that the upper sealing plate 5 is machined to perfectly accord with and tightly press against the edge of the gland 8. Such way requires high machining and assembly precision, and a slight error will create a gap 9 between the upper sealing plate 5 and the gland 8. Another solution is that as shown in FIG. 5-*c*, the edge of the liquid storage tank 121 is lower than the surface of the chip body 1, so that after embedding of the gland 8, the top of the gland is coplanar with the surface of the chip body 1. However, this also requires high machining and assembly precision, a too large gland 8 cannot be embedded, and a too small gland 8 is likely to cause a gap 9 between the side wall of the gland 8 and the chip body 1. Since the side wall of the gland 8 also needs to cover the micro flow channel groove in this solution, the presence of the gap 9 will cause the liquid to flow out of the groove. In addition, a relatively thick or thin gland 8 will also create undulations, and these problems all will cause the liquid to flow out of the micro flow channel groove, especially under the squeezing of external force. However, for the present invention, as shown in FIG. 5-*a*, the liquid is diverted to the micro flow channel groove on the other side through the through hole, which has low requirements for the machining and assembly precision. As the edge of the gland 8 does not need to cover the micro flow channel groove, the upper sealing plate 5 does not need to extend to cover the edge of the gland 8 or the part above the edge. In addition, as it does not require the side wall of the gland 8 to be used to cover the micro flow channel groove, the requirements for the size and thickness of the gland 8 are not high. Therefore, the machining is facilitated, and the yield rate is also improved. Specifically, as an embodiment, as shown in FIG. 5-*a* (the liquid storage bag not shown in the figure), the liquid storage tank 121 is a stepped groove including an edge platform 125, a bottom platform 123 and a liquid storage tank side wall 124. The liquid storage tank side wall 124 connects the inner edge of the edge platform 125 with the outer edge of the bottom platform 123; the liquid storage tank side wall 124 is disposed in an inclined manner, with the inclined surface facing upward; and the outer edge of the edge platform 125 is the edge of the liquid storage tank 121. The edge platform 125 is preferably lower than the surface of the chip body 1, and may also be higher than or coplanar with the surface of the chip body 1. The puncture needle 122 is disposed on the bottom platform 123, the tail end of the diversion groove 111 is located on the edge platform 125 and is not close to the outer edge of the edge platform 125, and the distance between the end of the diversion groove 111 and the outer edge of the edge platform 125 can be more than 1 mm, preferably more than 2 mm, and more preferably more than 3 mm. After the gland 8 covers the liquid storage tank 121, the edge of the gland 8 is partially bonded to the edge platform 125, so that the opening of the diversion groove on the edge platform 125 is closed by the gland 8, the opening of the through hole I 141 located on the edge platform 125 is closed by the gland 8, and thus finally, the liquid in the liquid storage tank 121 can only flow into the through hole I 141 through the diversion groove 111 under pressure. The part of the gland 8 in contact with the edge platform 125 can be fully bonded to the edge platform 125, or it is also possible that the outermost edge part is bonded to the edge platform 125. The bonding method may be replaced with other existing connection methods, including but not limited to ultrasonic welding, connection by a double sided adhesive layer, and plastic fusion connection.

As a whole, the diversion groove 111 passes the liquid storage tank side wall 124 to arrive at the edge platform 125 by following the inner surface of the liquid storage tank 121 in a straight direction or a curved path from the puncture needle 122, the tail end of the diversion groove 111 communicates with one end of the second micro flow channel 112 (a branch micro flow channel) on the back side of the chip body 1 through the through hole I 141, and the other end of the second micro flow channel 112 communicates with the fourth micro flow channel 114 (the main micro flow channel) through the through hole II 142. By means of such structure, the liquid storage bag 7 is squeezed and then punctured by the puncture needle 122, then the liquid in the liquid storage bag 7 flows out, and is diverted by the diversion groove 111 to flow into the second micro flow channel 112 through the through hole I 141, and after that, the liquid flows into the fourth micro flow channel 114 from the second micro flow channel 112 through the through hole II 142.

Obviously, there is no any micro flow channel groove connected between the diversion groove 111 and the fourth micro flow channel 114 on the front side of the chip body 1, but the diversion groove communicates with the fourth micro flow channel through the micro flow channel groove located on the back side, thus cleverly preventing the micro flow channel groove from passing through the gap 9 between the gland 8 and the chip body 1 or the gap 9 between the gland 8 and the sealing plate, so as to prevent the liquid from penetrating into the gap 9. On the other hand, since it does not need to consider the influence of the gap 9, the machining and assembly precision requirements for this part are not high, thus effectively saving the cost and improving the yield rate.

In addition, the edge platform 125 is also favorable for fixation of the liquid storage bag 7, the edge of the liquid storage bag 7 is bonded to the edge platform 125, and the gland 8 covered after that not only water-tightly covers the through hole I 141, but also further strengthens the fixed effect of the liquid storage bag 7. Preferably, the gland 8 wholly or partially water-tightly covers the diversion groove 111 located on the edge platform 125.

Preferably, as shown in FIG. 5-*a*, the bottom platform 123 protrudes from the back side of the chip body 1, which design increases the liquid storage capacity of the liquid storage tank 121.

By distributing the hydrophobic micro flow channels and the hydrophilic micro flow channels respectively on the back side and front side of the chip body 1, it helps to reduce the size of the microfluidic chip, and only one body is required for design and machining of the micro flow channels, thus facilitating the machining and assembly and contributing to cost reduction.

In addition, the diversion groove 111, the second micro flow channel 112 and the third micro flow channel 113 are designed to be hydrophobic micro flow channels, which can prevent the liquid from flowing too fast under the pushing of external pressure to result in bubbles. By designing the fourth micro flow channel 114 to be a hydrophilic micro flow channel, the power for flowing of subsequent liquid can be provided on the one hand. On the other hand, when the liquid flows through the electrode area of the sensor 4, the diffusion performance of the fluid in this area is effectively adjusted. For example, under the hydrophilic interaction, it is more advantageous for the liquid to completely cover the detection area (electrode area) of the sensor 4 in the micro flow channels in a flow process, and even if there are a plurality of detection sites with different surface tensions in the micro flow channels, the liquid also can diffuse more sufficiently, thus avoiding the generation of bubbles and ensuring the accuracy of detection. If the micro flow channels in the detection area are all hydrophobic, when the liquid flows in this micro flow channel, some areas of the sensor electrode may have different surface tensions and thus be bypassed by the liquid to form bubbles, which affects the accuracy of detection.

By changing the hydrophilicity and hydrophobicity of the diversion groove 111, the second micro flow channel 112, the third micro flow channel and 113 the fourth micro flow channel 114, the present invention is just for the purpose of improving the detection precision of the sensor 4. However, this does not mean that they cannot all be set to be hydrophobic, hydrophilic or other hydrophobic and hydrophilic combination in the case that the requirements for basic detection are satisfied.

The air permeable channel has the function of air expulsion, and when the liquid flows in the micro flow channel, if there is no channel for air discharge, the air at the front end of the liquid increases the air pressure at the front of the liquid due to squeezing, and thus stops flow of the liquid.

In some embodiments, the diversion groove 111, the second micro flow channel 112, and the third micro flow channel 113 have a width of 0.2 to 1 mm and a depth of 0.2 to 0.6 mm on the chip body 1; the fourth micro flow channel 114 has a width of 0.2 to 3 mm and a depth of 0.2 to 0.6 mm; and the chip body 1 has a thickness of 0.4 to 5 mm. Preferably, the diversion groove 111, the second micro flow channel 112, and the third micro flow channel 113 have a width of 0.4 mm and a depth of 0.3 mm. Preferably, the fourth micro flow channel 114 is a flow channel which is wider in the middle and narrower at both ends, with the widest part being not more than 2 mm wide and the narrowest part being not more than 1 mm wide.

In some embodiments, the chip body 1 is a transparent material, and it is also possible that only the sealing plate is a transparent material.

Embodiment 2 of Chip Body

As shown in FIG. 5-*d*, in this embodiment, the through hole I does not run through the inner surface of the liquid storage tank 121 and the back side of the chip body 1, but runs through the inner surface of the liquid storage tank 121 and the front side of the chip body 1, that is to say, the micro flow channels located on the back side of the chip body 1 are not connected between the diversion groove 111 and the fourth micro flow channel 114. In this implementation, the through hole I 141 in the chip body 1 spans the gap 9 between the gland 8 and the chip body 1 and/or the upper sealing plate 5. Although this method does not require high machining and assembly precision, it is more difficult than embodiment 1 because a pore passage is required to be excavated inside the chip body 1.

Embodiment 3 of Chip Body

It differs from embodiment 1 of the chip body in that the through hole I 141 is located on the bottom platform 123, so that the diversion groove 111 can also be optionally provided or not provided, as shown in FIG. 5-*e*. In addition, the solution is preferably applied to the case that the bottom platform 123 does not protrude from the back side of the chip body 1. If the bottom platform 123 protrudes from the back side of the chip body 1, it is equivalent to that the second micro flow channel is disposed on an uneven surface, so that a lower sealing plate 2 is required to fit the uneven surface, thus requiring higher machining and assembly precision to avoid a gap 9 between the back side of the chip body 1 and the lower sealing plate 2 resulted from unevenness during attachment, and this gap 9 may lead to liquid leakage.

Embodiment 4 of Chip Body

It differs from embodiment 3 of the chip body in that as shown in FIG. 5-*f*, the fourth micro flow channel 114 is located on the front side of the chip body 1, so that the liquid directly flows into the fourth micro flow channel 114 through the through hole I 141, instead of flowing into the micro flow channel on the front side of the chip body 1 through another through hole. In this way, leakage resulted from the liquid flowing through the gap between the gland 8 and the chip body 1 can be avoided, and the through holes and the complexity of the micro flow channels are also reduced.

Embodiments of Microfluidic Chip

In addition to the above chip body 1, a complete microfluidic chip further includes sealing plates (an upper sealing plate 5 and a lower sealing plate 2), a sensor 4 for detecting an analyte, a liquid storage bag 7 and a gland 8. The implementation below is illustrated by taking the chip body 1 in embodiment 1 as an example. The gland 8 fixes the liquid storage bag 7 in the liquid storage tank while covering the liquid storage tank 121. The front side of the chip body 1 is covered with the upper sealing plate 5, and the upper sealing plate 5 covers the fourth micro flow channel 114, a detection slot 151, a through hole II 142, a through hole III 143, and a through hole IV 144. The sensor 4 is bonded to the back side of the chip body 1 by a bonding layer 3 and covers the detection slot 151. The part of the sensor 4 for detecting the analyte is completely or incompletely located in the detection slot 151. If the part is completely located in the detection slot 151, the detection precision can be improved. Preferably, the back side of the chip body 1 may be provided with a sensor slot 12 fitting the sensor 4, and the surface of the sensor is ensured to not protrude from the back side of the chip body 1 after the sensor 4 is placed in the sensor slot. The back side of the chip body 1 is also covered with the lower sealing plate 2, which covers the through hole I 141, the through hole II 142, the through hole III 143, the through hole IV 144, the air permeable channel, the waste liquid tank 115, the third micro flow channel 113, and the second micro flow channel 112. The lower sealing plate 2 may optionally cover, partially cover, or does not cover the sensor 4. In some embodiments, contacts of the sensor 4 for connecting wires extend out of the edge of the microfluidic chip, and are on the outside of the chip. In some embodiments, contacts of the sensor 4 do not face the back side the chip body 1, but are located on a side opposite to the detection part, so that the contacts should not be covered by the lower sealing plate 2. In some embodiments, contacts of the sensor 4 face the back side the chip body 1, so in order to achieve contact with the contacts, a through-going contact slot 152 should be provided in a corresponding position on the chip body 1 to enable the contact to be located in the contact slot 152. The contact slot 152 is covered by the sensor 4 but not by the upper sealing plate 5, or an opening 52 is disposed in a corresponding position on the upper sealing plate 5.

In the present invention, one or a plurality of each of the upper sealing plate 5 and the lower sealing plate 2 may be provided, and this embodiment is illustrated by taking one upper sealing plate 5 and one lower sealing plate 2 as an example. Preferably, the gland 8 should have a gland opening 83 for facilitating a hand or other instrument stretching in and squeezing the liquid storage bag 7 to puncture the liquid storage bag by the puncture needle 122, and the liquid in the bag enters the diversion groove 111 under squeezing. Or, the opening part may be replaced with a plastic or rubber with extensibility that, when depressed, also squeezes the liquid storage bag 7 below. Or, the opening part may be supplemented with a removable plastic cover (plastic film) that is removed when depressed.

Figure 1:
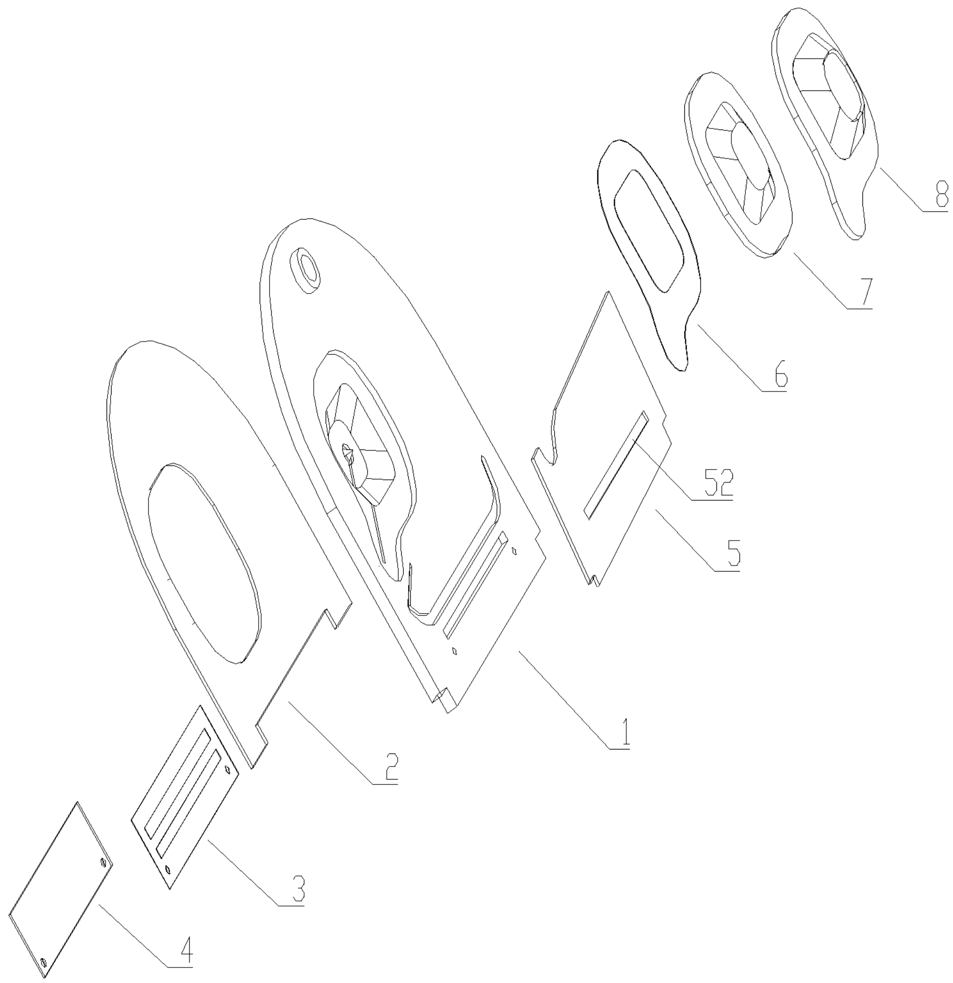
FIG. 1 is a structural schematic diagram of a microfluidic chip in an embodiment.
Figure 2:
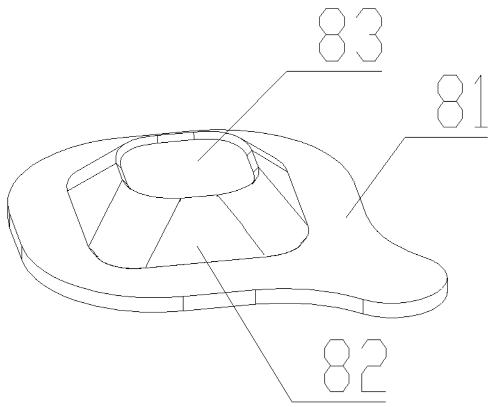
FIG. 2 is a structural schematic diagram of a gland in an embodiment.

In some embodiments, as shown in FIG. 2, the gland 8 includes a pressing plate 81 with an opening in the middle and a side plate 82; the bottom of the side plate 82 is disposed around the inner edge of the opening of the pressing plate 81, and the side plate 82 inclines inwards, but does not seal the opening of the pressing plate. Thus, a gland 8 with the gland opening 83 is formed. The side plate 82 can play a supporting role, for example, it can support some objects in unforeseen circumstances, so as to prevent the objects from forcing the liquid storage bag 7 to puncture the liquid storage bag 7 by the puncture needle 122.

In one embodiment, the chip body 1 is made of a hydrophobic material, the covering surface of the sealing plate covering the hydrophobic micro flow channel is hydrophobic, and the covering surface of the sealing plate covering the hydrophilic micro flow channel is hydrophilic.

The material of the chip body 1 is a hydrophobic material, or the surface of the chip body 1 is subjected to hydrophobic treatment, or the surface of the chip body 1 in contact with liquid is also subjected to hydrophobic treatment. The surface of the upper sealing plate 5 in contact with the chip body 1 is a hydrophilic material, or is treated with a hydrophilic material. The surface of the lower sealing plate 2 in contact with the chip body 1 is a hydrophobic material, or is treated with a hydrophobic material. The hydrophobic material can be made of any one or a mixture of two of the following materials, such as silicon, ceramic, glass and plastic, wherein the plastic is selected from acrylonitrile-butadiene-styrene co-polymer (ABS), cyclo olefin polymer (COP), polyamide (PA), polybutylene terephthalate (PBT), polycarbonate (PC), polydimethylsiloxane (PDMS), polyethylene (PE), polyether polyethylene (PE), polyetheretherketone (PEEK), polyethylene terephthalate (PET), polymethyl methacrylate (PMMA), polyformaldehyde (POM), polypropylene (PP), polyvinyl diethyl ether (PPE), polystyrene (PS), polysulfone (PSU), polytetrafluoroethylene (PTFE), etc. The hydrophilic material may be a material in which the surface of the hydrophobic material is treated to have hydrophilic groups and finally exhibits hydrophilic properties, such as plasma treatment or hydrophilic coating. The material with hydrophilcity can also be directly selected, for example, a hydrophilic substance is added to the raw material during injection molding.

In some embodiments, the microfluidic chip is not provided with the liquid storage bag 7, the puncture needle 122 and the gland 8; the liquid is sealed in the liquid storage tank 121 by a resilient sealing plate, and flows into the diversion groove 111 after squeezing. In some embodiments, the microfluidic chip is not provided with the gland 8. The part of the diversion groove 111 located on the edge platform of the liquid storage tank 121 and the through hole I 141 are covered by the bonding layer 6.

In some embodiments, the waste liquid tank 115 is hydrophobic, in order to prevent backflow of the liquid from the waste liquid tank 115 to the fourth micro flow channel 114.

In some embodiments, the waste liquid tank 115 is hydrophobic, it is a flow channel with a width of not less than 2 mm, and the inner diameter of the through hole communicating with the waste tank 115 is not more than 1.5 mm. Preferably, the flow channel has a width of not more than 5 mm. On the one hand, the control of the liquid can be strengthened to prevent the liquid from flowing back to the fourth micro flow channel 114. On the other hand, the flow channel design can prevent the generation of bubbles, which will occupy a relatively large volume, thus reducing the volume of liquid that can be held in the waste liquid tank 115.

In some embodiments, the upper surface of the injection port 13 is higher than the front side of the chip body 1. Preferably, the upper surface of the injection port 13 is not more than 5 mm higher than the front side of the chip body 1. More preferably, the upper surface of the injection port 13 is not more than 3 mm higher than the front side of the chip body 1. Even more preferably, the upper surface of the injection port 13 is not more than 2 mm higher than the front side of the chip body 1. A relatively deep injection port 13 can conveniently position and fix the injection needle.

Figure 3:
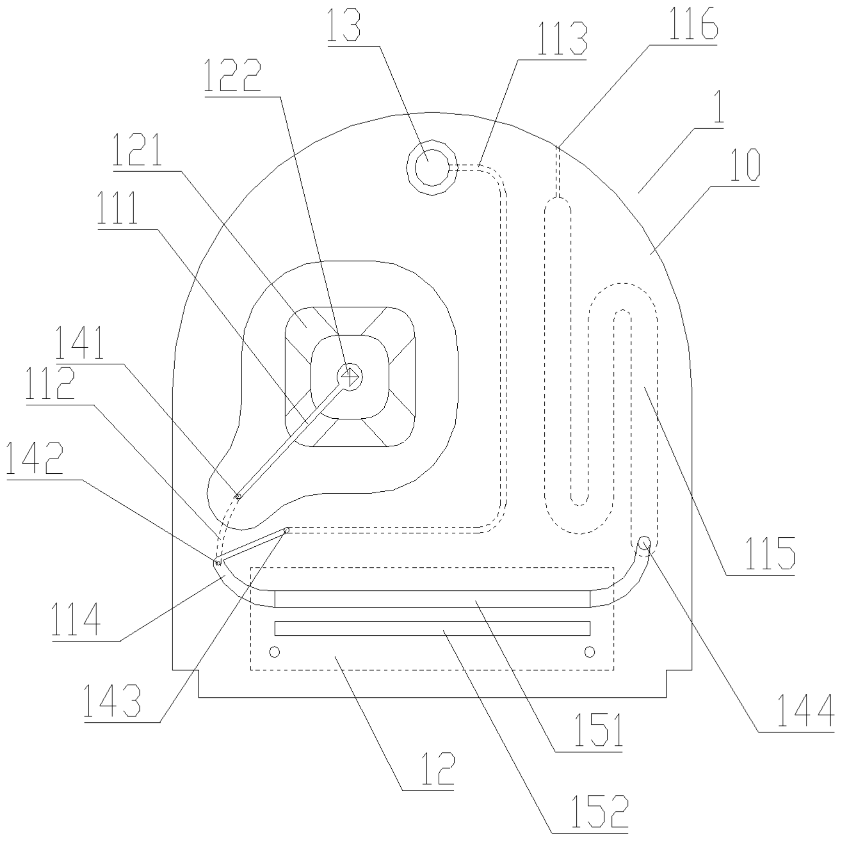
FIG. 3 is a front perspective schematic diagram of a chip body in an embodiment, with the micro flow channels located on the back side of the chip body being indicated by dashed lines.

The present invention provides two design solutions for the air permeable channel the first solution is: as shown in FIGS. 3 and 6, the air permeable channel is an air permeable flow channel 116, the tail end of the waste liquid tank 115 is connected with the air permeable flow channel 116 which is hydrophobic, the other end of the air permeable flow channel 116 communicates with outside atmosphere, and the air permeable flow channel 116 has a width of not more than 1 mm and a depth of not more than 1 mm. Preferably, the cross section area of the air permeable flow channel 116 is not more than 1 $mm^2$. Preferably, the connection of the air permeable flow channel 116 and the waste liquid tank 115 is subjected to non-smooth transition treatment, thus enhancing the interfacial effect and preventing the liquid from entering the permeable flow channel 116, playing the role of allowing passage of air but blocking passage of the liquid.

Figure 7:
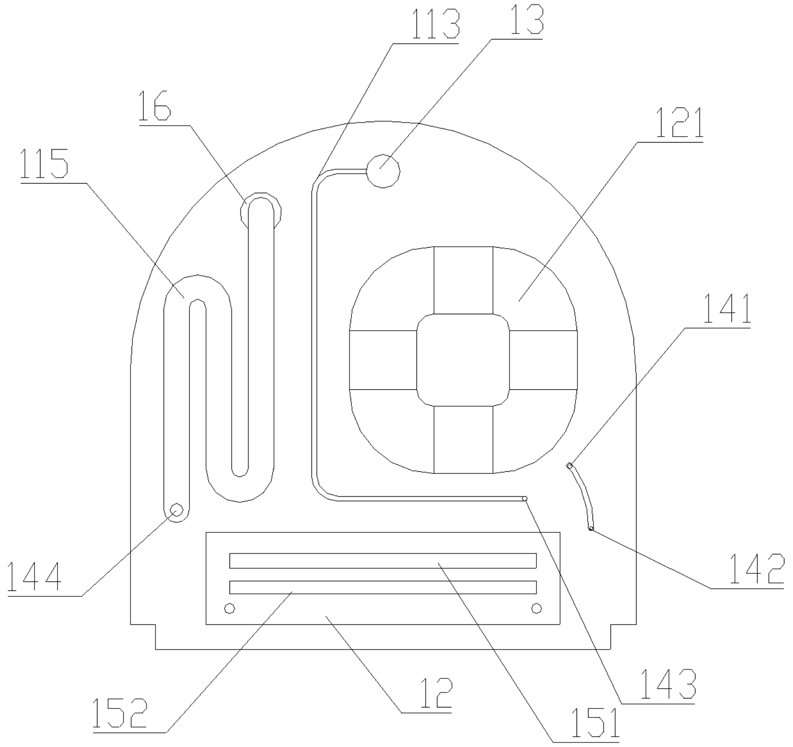
FIG. 7 is a structural schematic diagram of the back side of the chip body in an embodiment.
Figure 8:
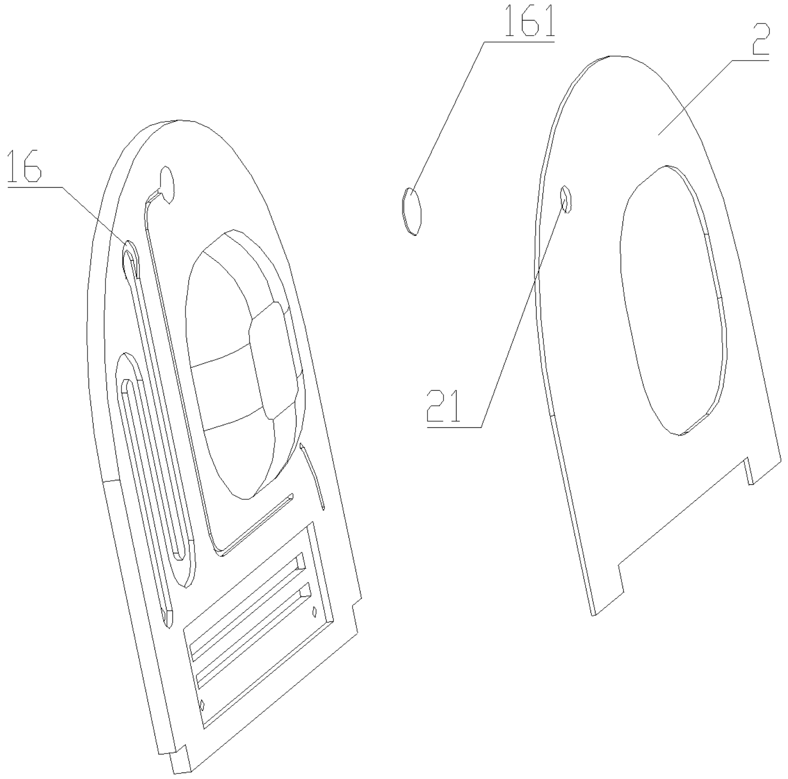
FIG. 8 is a structural schematic diagram of a combination of the chip body, an air permeable film and a sealing plate in an embodiment.

The second solution is: as shown in FIGS. 7-9, the air permeable channel includes an air permeable groove 16 and an air permeable film 161 which is air permeable but water impermeable; the tail end of the waste liquid tank communicates with the air permeable groove 16, the edge of the tail end of the waste liquid tank is located in the air permeable groove 16, and has a depth larger than that of the air permeable groove 16; the bottom of the air permeable groove 16 is covered with the air permeable film 161, which completely covers the tail end of the waste liquid tank and is covered with the sealing plate, the sealing plate is provided with an air permeable hole 21 corresponding to the air permeable groove 16 in position, so that the air in the waste liquid tank can enter outside atmosphere through the air permeable film 161. In order to prevent waste liquid from flowing out of the waste liquid tank 115, preferably, the upper surface of the air permeable film 161 in the air permeable groove 16 is not lower than the front side of the chip body 1, so that after the upper sealing plate 2 covers the front side of the chip body 1, there's no gap between the air permeable film 161 and the upper sealing plate 2. At the same time, air can pass through the air permeable film 161 only in the direction perpendicular to the air permeable film 161, so that the tail end of the waste liquid tank 115 needs to be disposed below the air permeable film 161, as shown in FIG. 9. Further, in order to improve the sealing effect, the contact part between the air permeable film 161 and the upper sealing plate 2 should be treated with an adhesive.

The working flow of the microfluidic chip is as follows:

Taking the chip body 1 in FIG. 3 as an example, in this embodiment, the microfluidic chip is horizontally inserted into a detecting instrument, but of course, it can also be inserted slantly or vertically. After or before the microfluidic chip is inserted into a corresponding detecting instrument, the liquid storage bag 7 in the liquid storage tank 121 is squeezed by a hand or by the instrument. After the liquid storage bag 7 is punctured by the puncture needle 122 in the liquid storage tank 121, the calibration solution in the bag flows into the diversion groove 111 under pressure, followed by entering the second micro flow channel 112 on the back side of the chip body 1 via the through hole I 141, and subsequently entering the fourth micro flow channel 114 on the front side of the chip body 1 through the through hole II 142. The calibration solution fills in the detection slot 151 under the pulling of a tension. As the tail end of the fourth micro flow channel 114 is connected with the hydrophobic waste liquid tank 115, the calibration solution will not enter the waste liquid tank 115, or in some cases, a part of the calibration solution enters the waste liquid tank 115 under the influence of squeezing the liquid storage bag 7, and the detecting instrument starts to work at this moment, so as to analyze components of relevant analytes (e.g. sodium ion, potassium ion, calcium ion, etc.) in the calibration solution by the sensor 4, and perform calibration on itself.

Next, a syringe needle is inserted into the injection port 13, and meanwhile the blood therein is injected into the third micro flow channel 113 and then enters the fourth micro flow channel 114 through the through hole III 143. At the same time, as the blood flows in the micro flow channels, the calibration solution in the fourth micro flow channel 114 is also completely pushed into the waste liquid tank 115. The blood enters the fourth micro flow channel 114 and then passes by the through hole II 142 but does not enter the same, and eventually the blood fills in the detection slot 151 under the pulling of a tension. The detecting instrument starts to detect relevant components in the blood.

A preparation method of a microfluidic chip includes:

step 1, a hydrophobic material is selected as a substrate, and a micro flow channel groove, a liquid storage tank, through holes, an injection port and other structures are formed on the chip body by etching, engraving, hot pressing or injection molding; specifically, the micro flow channel groove includes a main micro flow channel groove, the through holes include a through hole I disposed in the liquid storage tank, with one opening of the through hole I being located on the inner surface of the liquid storage tank, and the other opening of the through hole I communicating with the micro flow channel groove, thereby allowing the liquid in the liquid storage tank to flow into the main micro flow channel groove; the injection port communicates with the micro flow channel groove, thereby allowing the liquid injected into the injection port to flow into the main micro flow channel groove;

step 2, a sensor is obtained and bonded to the surface of the chip body, so that the detection area of the sensor is located in the main micro flow channel groove;

step 3, a sealing plate is obtained and water-tightly covers the micro flow channel groove located on the surface of the chip body, and the opening of the micro flow channel groove is closed to form a micro flow channel; and step 4, a gland is obtained and water-tightly covers the opening of the liquid storage tank.

A microfluidic detection chip that can be used for detection is finally obtained through the method including steps 1-4. The sequences of steps 2-4 can be adjusted without conflicts.

Preferably, in step 1, the inner surface of the liquid storage tank is provided with a diversion groove for diversion of liquid, and one end of the diversion groove is connected with the through hole I.

Preferably, in step 4, the liquid storage bag and the gland are obtained, the liquid storage bag is fixed in the liquid storage tank, and then the gland water-tightly covers the opening of the liquid storage tank.

Preferably, in step 1, the puncture needle is prepared on the inner surface of the liquid storage tank, and is located below the liquid storage bag.

Preferably, in step 1, the puncture needle is connected with the through hole I through the diversion groove.

Preferably, in step 1, the chip body includes a front side and a back side, and the micro flow channel groove also includes a branch micro flow channel groove; the branch micro flow channel is located on the back side of the chip body, and the main micro flow channel groove is located on the front side of the chip body; the diversion groove communicates with the branch micro flow channel groove through the through hole I, and the branch micro flow channel groove communicates with the main micro flow channel groove through the through hole II located outside the liquid storage tank.

Preferably, in step 1, the liquid storage tank includes a bottom platform, a liquid storage tank side wall, and an edge platform located above the bottom platform, and the outer edge of the bottom platform is connected with the inner edge of the edge platform through the liquid storage tank side wall which inclines upwards.

Preferably, in step 1, one end of the diversion groove is disposed on the bottom platform, the other end of the diversion groove is disposed on the edge platform, the opening at one end of the through hole is located on the edge platform, and in step 4, the through hole is covered by the gland.

Preferably, in step 4, the gland includes a pressing plate with an opening in the middle and a side plate; the bottom of the side plate is disposed around the inner edge of the opening of the pressing plate, and the side plate inclines inwards, but does not seal the opening of the pressing plate.

Preferably, in step 1, the bottom platform protrudes from the back side of the chip body.

Preferably, in step 1, the chip body is provided with a hydrophobic waste liquid tank communicating with the main micro flow channel groove, and the tail end of the waste liquid tank is provided with an air permeable channel which is air permeable but water impermeable.

Preferably, in step 1, the chip body is made of a hydrophobic material; in step 3, the covering surface of the sealing plate covering the back side of the chip body is hydrophobic, and the covering surface of the sealing plate covering the front side of the chip body is hydrophilic.

The detection method in the detection area described in the present invention may be a biosensor with an electrode, or an optical detection method such as turbidimetry, fluorescence method, chemiluminescence method and scattering method.

The microfluidic detection chip described in the present invention can perform quantitative, semi-quantitative or qualitative detection. For example, one or more test papers (either blank test papers, or test papers with pre-added reagents) are fixed in the detection area. After the detection reagent or sample flows past the detection flow channel to come into contact with the test papers, the reagent reacts with the sample to generate color change, and then the detection result can be obtained through instrument or human observation.

The embodiments illustrated above are merely preferred embodiments, and can be combined with each other on the premise of no conflicts. Furthermore, they also can be combined with technical features obtained from the accompanying drawings of the specification.

The invention claimed is:

1. A microfluidic chip for detection of an analyte, comprising a chip body, an upper sealing plate, a lower sealing plate, and a sensor for detecting the analyte, wherein the chip body includes a front side and a back side;

an injection port, a liquid storage tank, a detection slot, and a micro flow channel groove distributed on the front side surface of the chip body, wherein the liquid storage tank is water-tightly sealed by the upper sealing plate, thereby forming a sealing area on the chip body having an outer perimeter boundary, the micro flow channel groove is water-tightly sealed by the upper sealing plate to form a first micro flow channel that is fluidly connected to liquid storage tank and that terminates within the outer perimeter boundary of the sealing area, and the detection slot overlies the sensor;

a second micro flow channel distributed on the back side surface of the chip body that is water-tightly sealed by the lower sealing plate;

a third micro flow channel distributed on the front side surface of the chip body that is water-tightly sealed by the upper sealing plate;

a first through hole extending through the chip body from the front side surface to the back side surface comprising a first opening on the front side surface of chip body within the sealing area outer perimeter boundary that is fluidly connected to the first micro flow channel, and a second opening on the back side surface of chip body that is fluidly connected to a first end of the second micro flow channel thereby providing a fluid flow path allowing the liquid in the liquid storage tank to flow into the second micro flow channel;

a second through hole extending through the chip body from the front side surface to the back side surface comprising a first opening on the back side surface of chip body that is fluidly connected to a second end of the second micro flow channel, and a second opening on the front side surface of chip body that is fluidly connected to a first end of the third micro flow channel, wherein a second end of the third micro flow channel is fluidly connected to the detection slot thereby providing a fluid flow path allowing the liquid in the liquid storage tank to flow into the detection slot;

wherein the injection port is fluidly connected to the first end of the third micro flow channel, thereby providing a fluid flow path allowing liquid injected into the injection port to flow into the detection slot; and wherein the liquid in the liquid storage tank bypasses the outer perimeter boundary during flow into the second micro flow channel via the flow path provided by the first micro flow channel and the first through hole.

2. The microfluidic chip according to claim 1, wherein the upper sealing plate comprises a liquid storage bag, or a gland and a liquid storage bag.

3. The microfluidic chip according to claim 2, wherein the upper sealing member comprises the gland and the liquid storage bag fixed in the liquid storage tank by the gland.

4. The microfluidic chip according to claim 3, wherein the liquid storage tank comprises a bottom platform, a liquid storage tank side wall, and an edge platform located above the bottom platform, and the outer edge of the bottom platform is connected with the inner edge of the edge platform through the liquid storage tank side wall, the wall surface of which inclines upwards; and the gland covers and seals the edge platform of the liquid storage tank.

5. The microfluidic chip according to claim 4, wherein the first opening of the first through hole is located on the edge platform, or the liquid storage tank side wall, or the bottom platform.

6. The microfluidic chip according to claim 3, wherein the gland comprises a pressing plate comprising a central opening and a side plate, wherein the bottom of the side plate is disposed around the inner edge of the opening of the pressing plate, and the side plate inclines inwards, but does not seal the opening of the pressing plate.

7. The microfluidic chip according to any of claim 1-5 or 6, wherein the chip body is provided with a hydrophobic waste liquid tank in fluid communication with the third micro flow channel, and an end of the waste liquid tank is provided with an air permeable channel which is air permeable but water impermeable.

* * * * *